United States Patent
Smith et al.

(10) Patent No.: US 7,554,971 B2
(45) Date of Patent: *Jun. 30, 2009

(54) METHOD AND SYSTEM FOR ESTIMATING PERFORMANCE METRICS IN A PACKET-SWITCHED COMMUNICATION NETWORK

(75) Inventors: Donald E. Smith, Lexington, MA (US); Man Li, Bedford, MA (US)

(73) Assignee: Verizon Laboratories Inc., Waltham, MA (US)

( * ) Notice: Subject to any disclaimer, the term of this patent is extended or adjusted under 35 U.S.C. 154(b) by 763 days.

This patent is subject to a terminal disclaimer.

(21) Appl. No.: 11/146,711

(22) Filed: Jun. 7, 2005

(65) Prior Publication Data

US 2005/0220088 A1 Oct. 6, 2005

Related U.S. Application Data

(63) Continuation of application No. 09/677,023, filed on Sep. 29, 2000, now Pat. No. 6,912,216.

(60) Provisional application No. 60/157,155, filed on Sep. 30, 1999.

(51) Int. Cl.
*H04L 12/66* (2006.01)

(52) U.S. Cl. .................. 370/352; 370/231; 370/252

(58) Field of Classification Search .............. 370/352, 370/252, 231–235, 229, 401, 395.52, 395.21
See application file for complete search history.

(56) References Cited

U.S. PATENT DOCUMENTS

| | | | | |
|---|---|---|---|---|
| 6,385,172 | B1 * | 5/2002 | Kataria et al. | 370/238 |
| 6,535,742 | B1 * | 3/2003 | Jiang et al. | 455/452.2 |
| 6,647,008 | B1 * | 11/2003 | Galand et al. | 370/389 |

OTHER PUBLICATIONS

G. Kesidis, J. Walrand, and C-S. Chang, Effective Bandwidths for Multiclass Markov Fluids and Other ATM Sources, IEEE/ACM Transactions on Networking, vol. 1, Issue 4, Aug. 1993, pp. 424-428.

* cited by examiner

*Primary Examiner*—Brian D Nguyen

(57) ABSTRACT

A method for estimating end-to-end quality of service (QOS), such as packet loss, delay, and delay jitter, in a packet-switched communications network includes steps for calculating packet loss and packet delay each router output link in a network path and using the packet loss and packet delay calculations for each individual router output link to estimate end-to-end QOS. The method includes calculating the loss probability for all possible numbers of active sources to take into account changes in the number of active sources as active sources connect to and disconnect from the network. As a result, the inventive method allows the number of active sources to vary in its estimation of end-to-end packet loss, delay, and delay jitter for enhanced Internet Protocol network planning.

12 Claims, 1 Drawing Sheet

METHOD AND SYSTEM FOR ESTIMATING PERFORMANCE METRICS IN A PACKET-SWITCHED COMMUNICATION NETWORK

REFERENCE TO RELATED APPLICATIONS

This application is a continuation of and claims the benefit of prior U.S. application Ser. No. 09/677,023, filed Sep 29, 2000 (now U.S. Pat. No. 6,912,216,"METHOD AND SYSTEM FOR ESTIMATING PERFORMANCE METRICS IN A PACKETS WITCHED COMMUNICATION NETWORK"), which in turn claims the benefit of U.S. Provisional Application No. 60/157,155, filed Sep 30, 1999, The above-identified applications are incorporated herein in their entireties.

TECHNICAL FIELD

The present invention relates to packet-switched communication networks, and more particularly to a method and system for estimating traffic between sources and destinations in a communications network.

BACKGROUND OF THE INVENTION

Many Internet Service Providers ("ISPs") provide Enhanced Internet Protocol ("EIP") real time services such as voice-over IP, fax-over IP, unified messaging, and Internet call waiting over the IP network. The EIP real-time services differ from non-real time, best-effort services provided over Transmission Control Protocol ("TCP"); unlike best-effort services, EIP services have end-to-end quality of service (QOS) requirements for packet loss, delay and delay jitter. As a result, providing EIP services requires new processes for network resource planning.

Current processes are mostly based on a simple calculation of network link usage. However, this method of planning may result in poor quality for EIP services because it fails to address or estimate end-to-end QOS requirements, such as packet loss, delay and delay jitter.

Although these problems have been addressed by prior art methods, many known methods make Poisson arrival and/or exponential packet length assumptions about service traffic characteristics. In most cases, these assumptions are not applicable for EIP service traffic because different types of services have different packet length and inter-arrival distributions. Even for the same service, e.g. Voice over IP ("VoIP"), different voice encoders generate different traffic statistics. When silence compression capability is de-activated in the encoders, the resulting voice traffic consists of packets with constant length and constant inter-arrival time. Once the silence compression capability is activated, packet inter-arrival times vary.

Given the mix of many types of deterministic and non-deterministic service traffic, approaches using large deviation theory to estimate end-to-end QOS have been suggested. However, large deviation theory-based estimates assume that there are a fixed number of active sources feeding the network. For example, large deviation theory calculations may assume that there are $n_1$ voice calls, $n_2$ fax calls, and $n_3$ e-mail messaging calls, $n_1$, $n_2$, and $n_3$ being fixed numbers, which are active and that generate traffic at any given time. In reality, the number of active sources feeding the network varies over time because calls are constantly connected and disconnected over any given time period, thereby increasing or decreasing, respectively, the total number of active calls. Thus, a direct application of the large deviation theory as taught by the known art is not the most appropriate method for estimating end-to-end QOS.

There is need for a process that estimates end-to-end packet loss, delay, and delay jitter for EIP network planning using the large deviation theory while taking into account changes in the number of active sources feeding the network.

SUMMARY OF THE INVENTION

Accordingly, the present invention is directed to a method for estimating end-to-end quality of service (QOS), such as packet loss, delay and delay jitter, in an enhanced IP network for use in network planning. The inventive method includes estimating the blocked traffic and carried traffic from each gateway in the network, determining a possible number N of active sources, using a network routing algorithm to estimate the carried traffic for each network link, calculating at least one QOS characteristic for each network link by varying the number N for each calculation, and estimating an end-to-end QOS characteristic by summing the QOS characteristics for the network links. The inventive method therefore enhances network planning by explicitly taking into account variances in the number of sources when estimating end-to-end QOS, thereby more reflecting real-world operation more accurately.

DETAILED DESCRIPTION OF THE PREFERRED EMBODIMENTS

Figure 1:
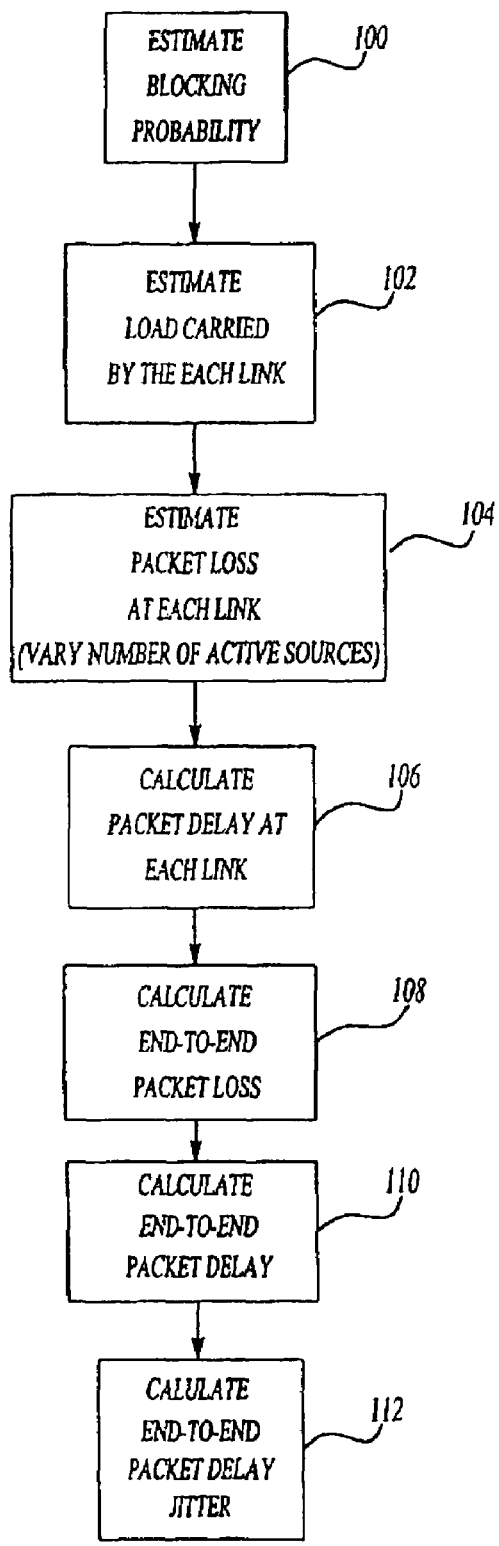
FIG. 1 is a flowchart illustrating one embodiment of the inventive method.

FIG. 1 illustrates a preferred embodiment of the inventive method. As is known in the art, an Internet Protocol ("IP") network contains inter-connected routers. To provide real time IP ("EIP") services, gateways are deployed at the edge of an IP network. A gateway is connected to a public switched telephone network ("PSTN") through Primary Rate Interface ("PRI") links on one side and to the IP network on the other side. The gateway translates between the PSTN and IP networks.

During network planning, offered call rates to each gateway are estimated. Because each gateway has only a limited number of available PRI links, some of the offered calls may be blocked. Moreover, calls of one service type may experience a higher blocking probability than calls of another type. An equation described in Kaufman, "Blocking in a Shared Resource Environment", *IEEE Transactions on Communications,* vol. COM-29, No. 10, October 1981, incorporated herein by reference, is used to determine the probability that calls will be blocked or carried by the network at step 100. Kaufman's algorithm is preferred over an Erlang blocking model because Kaufman's algorithm gives blocking probabilities per type, whereas the Erlang model provides only the blocking probability for the aggregate of all calls.

The method generally involves first computing the QOS for each individual link and then using the individual link information to estimate the end-to-end QOS. More particularly, steps 102 through 106 involve calculating QOS for each individual link, while steps 108 through 112 use the data obtained with respect to the individual links to estimate end-to-end QOS. At step 102, the process uses the routing algorithm of the IP network to estimate, in Erlangs, the load carried by each link. As understood by those skilled in the art, an Erlang is defined as the aggregate of continuous occupation of a channel for one hour, where an intensity of one Erlang means the channel is continuously occupied.

The packet loss at a router output link is calculated at step 104. In this step, it is assumed that the bandwidth available to EIP services at a router link is C. In this calculation, it is assumed that there are $N_i$ independent sources of type i, where i=1, ..., K. Two calls are of the same type if they present same traffic statistics, usually if they employ the same type of voice encoder. For example, a VoIP call and a Voice messaging call may be of the same type if they both use the ITU G.729 standard with silence compression. For each source of type i, $R_i$ and $\overline{R_i}$ denote the maximum and average traffic rate of the type i source. Further, in the calculations below, $N=(N_1, \ldots N_k)$, $R_i=(R_1, \ldots R_k)$, $\overline{R_i}=(\overline{R_1}, \ldots \overline{R_k})$. The value N can be either assumed or determined to take on different values to take into account the fact that the number of active sources varies over time in a real-world network.

Also in the calculation of packet loss for a single output link, for a single source of type i, $A_i(t)$ denotes the number of arrivals of a single type i source in period (0, t). Its asymptotic log moment generating function is:

$$\gamma_i(\Theta) = \lim_{t \to \infty} \frac{\log E[e^{\Theta A_i(t)}]}{t} \qquad (1)$$

The effective bandwidth function of the type i source is:

$$a_i(\Theta) = \frac{\gamma_i(\Theta)}{\Theta} \qquad (2)$$

Next, let G={N:[N·R]>C and [N·R]<C}, where [N·R] denotes a scalar product of N and R. If the scalar product N·R is less than C, there is no queuing, and therefore no packet delay even if all of the sources transmit at peak rate because the queue has not yet been saturated; in this case, packet delay is caused only by transmission delay. If the scalar product is greater than C, however, the queue is saturated and will experience delays due to an overload of the link. Next, the following equation is solved for Θ. δ(N) is defined as the solution for this equation and will be referenced below in equation (4).

$$\sum_{i=1}^{K} N_i a_i(\Theta) = C \qquad N \in G \qquad (3)$$

Next, b is defined as the buffer size of the router output buffer assigned to EIP services. According to large deviation theory, which is known in the art:

$$P(Q > b|N) \sim e^{-b\delta(N)} \text{ as } b \to \infty \qquad (4)$$

where P(Q>b|N) is the loss probability conditioned on N.

The above definitions and calculations will now be used to calculate the packet loss at the router output link, taking into account changes in the number of active sources N over time. More particularly, when a type i call is admitted into the network and starts to generate packets, it becomes a new active source of type i. When the call completes, the number of active sources N is reduced by one; as a result, N varies over time as calls enter and leave the network. During peak times, there are typically a large number of active sources feeding the link. A Poisson distribution can model the number of active sources in the link as follows:

$$P(N) = \prod_{i=1}^{K} \frac{\rho_i^{N_i}}{N_i!} e^{-\rho_i} \qquad (5)$$

where $\rho_i$ is the offered load of type i service in Erlang. Removing the dependence on N, the probability of packet loss at a router output link is as follows:

$$P(Q > b) = \sum_{N \in G} P(N) \times e^{-b\delta(N)} + \sum_{N \in \{|N \cdot \overline{R}|\} > C} P(N) \qquad (6)$$

The calculation in equation (6) takes into account the fact that N varies over time by summing, over all possible values of N, the less probabilities P(Q>b|N) weighted by the probability that N occurs. This expression also assumes that the number of active sources will vary slower than the contents in the buffer. As a result, this estimate more closely reflects the way in which active sources feed into the link.

Next, at step 106, the inventive method calculates the packet delay for an individual router output link. In this calculation, D is a random variable representing the packet delay at a router output link. The packet delay distribution may be obtained from packet loss at the router output link, which was calculated in step 104, as follows:

$$P(D>d)=P(Q/C>d)=P(Q>dC) \qquad (7)$$

where C is the output link speed.

At this point, the probability of both packet loss and packet delay at an individual router output link has been calculated for all possible values of N active sources, thereby taking into account changes in the number of active sources in the network. Next, steps 108 through 112 take the single link statistic calculations from steps 102 through 106 and use them to calculate end-to-end packet statistics.

Step 108 of the inventive method involves calculating the end-to-end packet loss. In this calculation, it is assumed that the losses occur independently along the end-to-end path and that there are a total number of L router output links. Preferably, the loss and delay characteristics for each one of the L router output links is calculated according to steps 104 and 106 described above. With respect to the end-to-end packet loss calculation at step 108, $\rho_i$ is defined as the loss probability of an ith link along the path. The total end-to-end loss probability along the path is then calculated to be:

$$1 - \prod_{i=1}^{L} (1 - p_i) \qquad (8)$$

Next, the end-to-end packet delay is calculated at step 110. In this calculation, it is assumed that the delay for each individual packet occurs independently, without being influenced by delays in other packets along the path. To calculate the end-to-end packet delay, $f_i(x)$ is the delay distribution of the ith link along the path. The end-to-end delay distribution along the path is therefore defined as:

$$f(x)=f_1(x) \otimes f_2(x) \ldots \otimes f_L(x) \qquad (9)$$

where f(x) is the end-to-end delay distribution and $\otimes$ denotes convolution. More specifically, the end-to-end delay distribution is the convolution of the link delay distributions along the path.

Next, at step 112, the inventive process calculates the end-to-end packet delay jitter. In this step, the user can select a specific delay jitter percentage p for the computation (e.g., 95%, 98% or 99% delay jitters). Delay jitter is defined as $t_2-t_1$, where (100−p)/2 percent of packets experience delays less than $t_1$ ms and (100−p)/2 percent of packets experience delays greater than $t_2$ ms. In particular, $t_1$ and $t_2$ are found by solving the following equations.

$$\int_0^{t_1} f(x)dx = p/2 \qquad (10)$$
$$\int_{t_2}^{\infty} f(x)dx = p/2$$

Thus, the inventive method estimates end-to-end QOS by first estimating the amount of traffic blocked and carried by the network, preferably using Kaufman's algorithm, estimating single link statistics for each individual router output link in a path, taking into account variations in the number of active sources, and then using the single link statistics to calculate end-to-end QOS. In these calculations, it is assumed that the estimates of offered traffic for each service to each gateway is given, preferably in Erlangs. By calculating the loss and delay probability for all possible N number of active sources, as described by way of example in Equations (5) through (10), the inventive method provides a better estimate of network traffic because it considers the fact that the number of active sources will vary over time.

The inventive method can be carried out in any known network system. The system can include a database that contains the parameters (e.g. service type and characteristics) for each gateway in the system, a memory that stores an end-to-end quality service program corresponding to the inventive method, and a processor that executes the end-to-end quality service program according to the steps shown in FIG. 1. From the inventive method, the system can output network information such as Wide Area Network ("WAN") link utilization; one-way packet loss; one-way and two-way packet delay and delay jitter; gateway Primary Rate Interface ("PRI") link utilization and blocking probabilities per physical location; and/or global maximum PRI link utilization and maximum blocking probability.

An Internet Service Provider ("ISP") can therefore estimate network performance using the inventive method and system and, if QOS requirements are not met, reallocate sources and conduct the inventive method again quickly and easily to assess the effect of the reallocation on network performance. For example, the ISP may experiment with different traffic scenarios to distribute global origination traffic among network cities in different ways.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method, performed by a processor, of computing an end-to-end quality of service (QoS) parameter of a packet switched network, the packet switched network comprising multiple routers interconnected by a plurality of links, the packet switched network connected to a gateway to a circuit switched network that feeds a number of active sources of data to the packet switched network, the method comprising:
   determining a load carried by each of the plurality of links;
   computing a link QoS parameter value for each of the plurality of links based on the load carried by said link and taking into account changes in the number of active sources feeding the packet switched network by varying the number of active sources for each computation; and
   computing an end-to-end QoS parameter value using the link QoS parameter values for each link;
   wherein the link QoS parameter values measure at least one of single link packet loss probability and single link packet delay distribution.

2. The method of claim 1, wherein the load carried by each link in the network includes traffic of a plurality of service types, and wherein the plurality of service types include a plurality of voice over IP types.

3. The method of claim 1, further comprising:
   calculating an estimated amount of traffic carried at the gateway;
   wherein determining the load carried by each link in the network is based on the estimated amount of traffic carried at the gateway.

4. The method of claim 3, wherein the estimated amount of traffic carried at the gateway is calculated in Erlangs.

5. The method of claim 1, wherein calculating the estimated amount of traffic carried at the gateway uses Kaufman's algorithm.

6. A memory storing instructions executable by the processor and configured to cause the processor to perform the method of claim 1, when executed by the processor.

7. A method, performed by a processor, comprising:
   estimating a load carried for each of a plurality of links of a packet switched network using a network routing algorithm and based on a number of sources;
   calculating at least one quality of service parameter for each of the plurality of links using the estimated load carried for the network link and by varying the number of sources for each calculation; and
   estimating at least one end-to-end quality of service parameter by using the quality of service parameters for the plurality of links.

8. The method of claim 7, further comprising:
   estimating a quantity of carried traffic from a gateway connected to the packet switched network and a circuit switched network.

9. The method of claim 8, wherein estimating the quantity of carried traffic uses Kaufman's algorithm.

10. The method of claim 7, wherein the at least one quality of service parameter is one of single link packet loss probability and single link packet delay distribution.

11. The method of claim 7, wherein the at least one end-to-end quality of service parameter is one of end-to-end packet loss probability, end-to-end packet delay distribution, and end-to-end packet delay jitter.

12. A memory storing instructions executable by the processor and configured to cause the processor to perform the method of claim 7, when executed by the processor.

* * * * *